(12) United States Patent
Nakai

(10) Patent No.: US 9,062,697 B2
(45) Date of Patent: Jun. 23, 2015

(54) HIDDEN FASTENER

(76) Inventor: Gary T. Nakai, Skokie, IL (US)

( * ) Notice: Subject to any disclaimer, the term of this patent is extended or adjusted under 35 U.S.C. 154(b) by 654 days.

(21) Appl. No.: 13/099,709

(22) Filed: May 3, 2011

(65) Prior Publication Data

US 2011/0268529 A1 Nov. 3, 2011

Related U.S. Application Data

(60) Provisional application No. 61/330,645, filed on May 3, 2010.

(51) Int. Cl.
| | |
|---|---|
| *B60R 1/06* | (2006.01) |
| *F16B 5/02* | (2006.01) |
| *F16B 43/00* | (2006.01) |
| *A47G 1/16* | (2006.01) |
| *F16B 35/00* | (2006.01) |

(52) U.S. Cl.
CPC ............... *F16B 5/02* (2013.01); *F16B 35/005* (2013.01); *F16B 43/00* (2013.01); *A47G 1/1626* (2013.01)

(58) Field of Classification Search
CPC ......... F16B 43/003; F16B 21/09; F16B 12/16
USPC ................ 248/475.1, 489, 476, 217.4, 495; 403/362; 52/715; 40/757
See application file for complete search history.

(56) References Cited

U.S. PATENT DOCUMENTS

| | | | |
|---|---|---|---|
| 3,472,118 A | 10/1969 | Jureit | |
| 3,529,918 A | 9/1970 | Jureit | |
| 4,040,593 A | 8/1977 | Wiley | |
| 4,124,189 A | 11/1978 | Einhorn | |
| 5,255,885 A | 10/1993 | Iversen | |
| 5,262,197 A * | 11/1993 | Pollizzi | 427/195 |
| 5,743,576 A * | 4/1998 | Schron et al. | 294/215 |
| 6,299,123 B1 * | 10/2001 | Hayde | 248/476 |
| 7,183,885 B2 | 2/2007 | Nellessen, Sr. et al. | |
| 2003/0062731 A1 * | 4/2003 | Richmond et al. | 292/346 |
| 2007/0183866 A1 | 8/2007 | Gallien | |
| 2010/0116964 A1 | 5/2010 | Aleo | |

* cited by examiner

*Primary Examiner* — Joanne Silbermann
(74) *Attorney, Agent, or Firm* — Greer, Burns & Crain, Ltd.

(57) ABSTRACT

A fastening assembly for fastening an object to a surface or a structure, and/or between structures or objects, includes a plate having a first and second hole. A first fastener extends through the first hole and is adapted for attaching the plate to the surface. A second fastener has a head configured to be received in the second hole to hold the second fastener to the plate and is adapted for connection to the object. Preferably at least one set screw extends from an edge of the plate to lock the plate to the second fastener. The plate is pivotal about both fasteners so that the plate can swivel providing flexibility in installation and use.

12 Claims, 4 Drawing Sheets

HIDDEN FASTENER

PRIORITY CLAIM AND CROSS REFERENCE

This application claims the benefit of U.S. Provisional Application No. 61/330,645, filed May 3, 2010.

FIELD

A field of the present invention is fastening devices, and in particular hidden fasteners used for fastening an object to a surface.

BACKGROUND

Objects such as art, mirrors, writing boards, and signs are often fastened to surfaces, such as walls, and other structures. Objects may be attached to a structure directly by fasteners, such as nails, screws, bolts, and the like. However, it is often desirable that the means by which the objects are attached to structures remain out of view for aesthetic reasons. Further, it may be desirable to mount objects such as artwork so that it appears as though the object is floating, rather than having an obvious frame or means of attachment. Visible fasteners can interfere with the appreciation of the artwork.

Similar problems are presented in the assembly of enclosure panels, where it is important that the attachment means are hidden from view and can securely join panel sections to each other or panel sections to superstructure, all the while allowing reliable removal and re-installation. In the automotive industry, for example, the unique shapes of dash panels require "hidden" attachment means that present fastener orientations at various angles and degrees of accessibility but they must be reliably secured in place.

In some cases, an object can be mounted with a "hidden" fastener by boring through the surface from a back side of the surface or otherwise installing the fastener from the backside of the mounting surface. However, it may be undesirable to have fastening hardware showing on the opposite side of the mounting surface. Additionally, accessing the opposite side of the mounting surface may be difficult or impossible.

While means of attachment such as picture wire and hooks may allow for hidden fasteners, the means of attachment to the mounting surface are relatively insecure, and can be easily dislodged.

Thus, there is a need for an attachment device that can securely fasten an object to a mounting surface while remaining hidden from view.

BRIEF SUMMARY

Some or all of the above-listed needs are met or exceeded by the present hidden fastener. In a simple embodiment, the fastening device of the invention is a plate featuring two oppositely directed tapered holes in conjunction with standard hardware to effect a reliable and secure attachment, yet one that is easily removed and reinstalled.

Another embodiment of a fastening assembly for fastening an object to a surface or other structure includes a plate having a cavity, a first fastener configured to engage the plate for attaching the plate to the structure, and a second fastener having a head configured to extend into the cavity in the plate to hold the second fastener to the plate. The second fastener is adapted for connection to the object.

More preferably the fastening assembly plate has a first hole and a second hole which forms the aforementioned cavity in the plate. The first fastener extends through the first hole and has a head to engage the plate. The second fastener of the fastening assembly has a head smaller than the second hole and is configured to extend into the second hole to removably hold the second fastener to the plate. The second fastener is adapted for connection to the object. The fastening assembly further preferably includes a locking member on the plate. The locking member is configured to selectively engage the head of the second fastener to secure the second fastener to the plate.

A more preferred embodiment of the fastening assembly for fastening an object to a surface includes a plate having a first hole and a cavity with an opening. The first fastener extends through and is rotatable within the first hole, and has a head to engage the plate. The first fastener is adapted for attaching the plate to the structure such that the plate is rotatable about the first fastener. The second fastener has a head that is smaller than the opening in the cavity. The fastener head is configured to pass though the opening and engage the plate within the cavity for removably holding the second fastener to the plate. The second fastener is also adapted for connection to the object. A locking member is located on the plate, the locking member configured to selectively engage the head of the second fastener to secure the second fastener to the plate.

The fastening device and assembly of the invention is a means to securely fasten objects to a surface or other structure such that the attachment means are not readily seen by the observer. The fastening device and assembly of the invention also allows no defacing on the viewable side of the object to be hung or mounted and all installation is accomplished from the viewing side of the vertical mounting surface.

DETAILED DESCRIPTION

Figure 1:
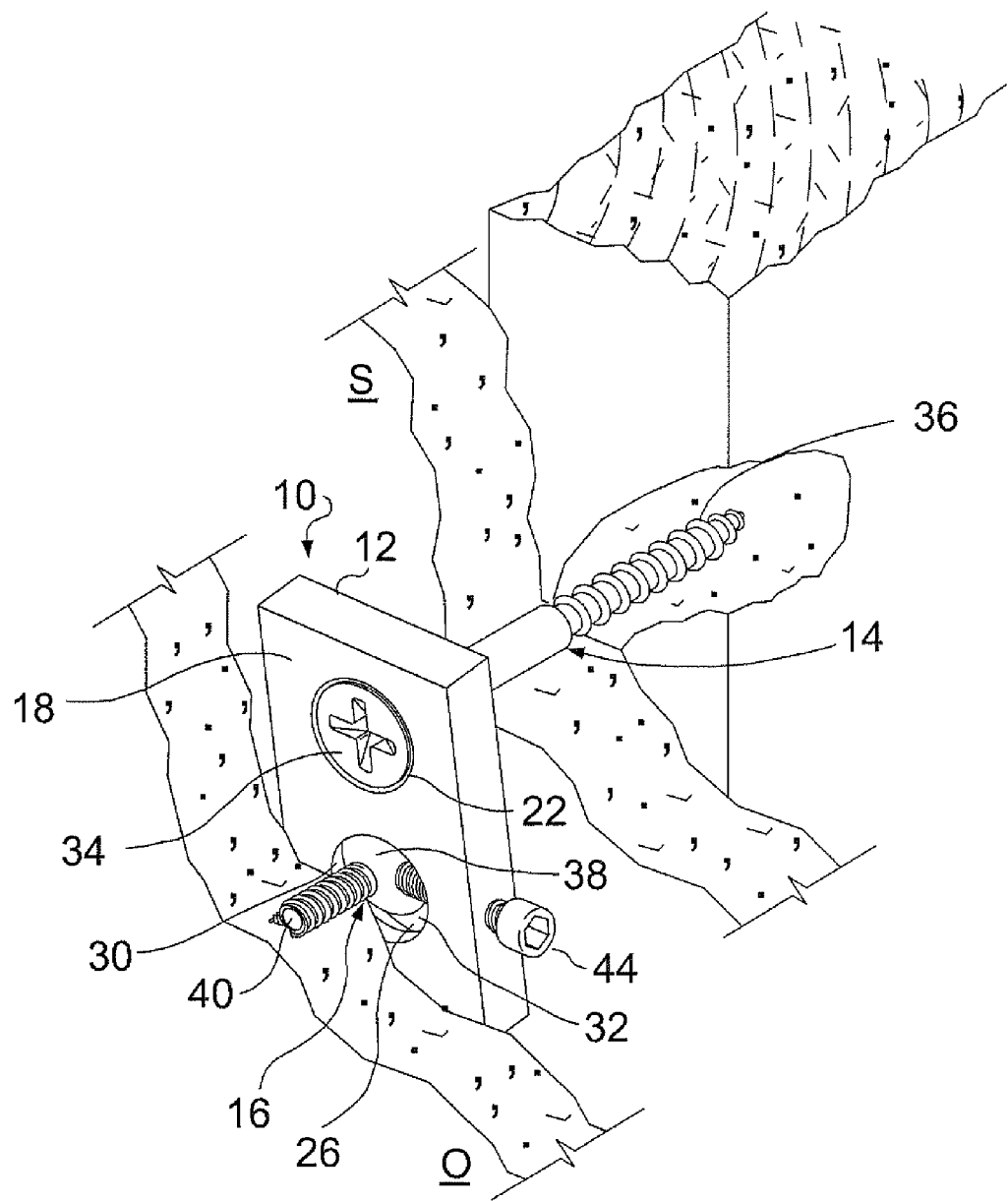
FIG. 1 is a cutaway perspective view of the fastening assembly of the invention.
Figure 2:
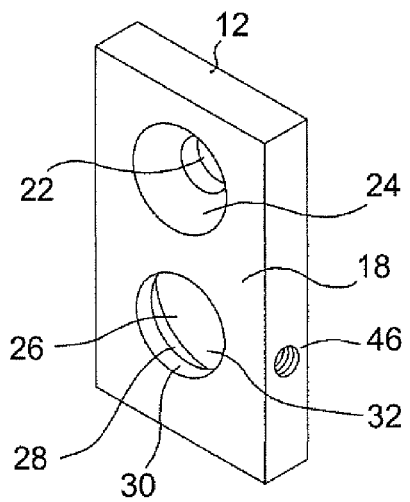
FIG. 2 is a front perspective view of the plate component of the fastening assembly.
Figure 3:
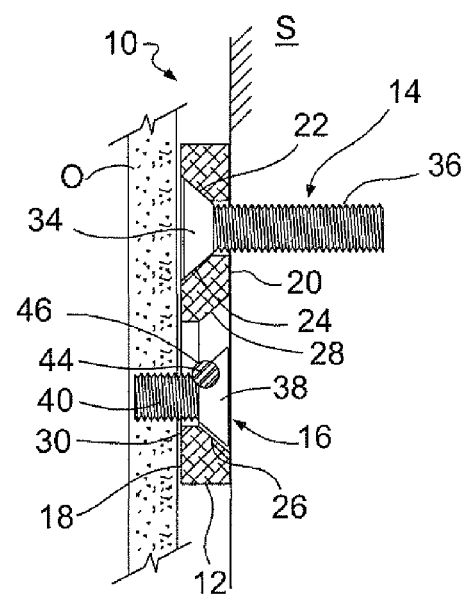
FIG. 3 is a vertical cross-sectional view of a second embodiment of the fastening assembly.

Referring now to FIGS. 1-3 a preferred embodiment of a fastening assembly for indoor or outdoor use is generally designated 10 for mounting an object O to a structure S. The terms "object" and "structure" should be given the broadest meaning. In particular, the term "structure" includes vertical, horizontal and angled surfaces, non-planar and irregular structures, and fixed and movable structures and other bodies. Further, the terms "object" and "structure" include like things such as a first and second panel. The fastening assembly 10 includes a plate 12, a first fastener 14, and a second fastener 16. The plate 12 has a front face 18 and a rear face 20, and is preferably fabricated from metal, such as steel, brass, or aluminum. Alternatively, the plate could be made from plastic, wood, or any other substantially rigid material. The plate is shown as rectangular, but can be any shape and any length.

The plate 12 preferably includes a first hole 22 having a countersink 24. The first hole 22 is configured to receive the first fastener 14, which extends through hole 22 to attach the plate to a mounting surface S. Alternatively, the first fastener may engage a slot in the plate. The plate 12 further includes a second hole or cavity 26 having a countersink 28. The countersink 28 of the second hole 26 forms a lip 30 at a front face opening 32 of the second hole. The second fastener 16 extends into the hole or cavity 26 to engage the lip 30. The distance separating the first and second holes 22, 26 is preferably kept relatively short but may be increased when appropriate and/or convenient for certain applications. The second hole 26 preferably extends through the plate 12; however, it is contemplated that the second hole may be a blind hole, extending only partially through the plate. Each of the holes is preferably countersunk or beveled, as shown in FIGS. 2 and 3 to match the shapes of the heads of the first and second fasteners 14, 16. That is, the holes are preferably countersunk in opposite directions, such that the first hole 22 is countersunk relative to the front face 18 of the plate 12, and the second hole 26 is countersunk relative to the rear face 20 of the plate. First and second holes 22 and 26 are preferably formed by drilling, punching and embossing, molding, or other known methods.

Figure 4A:
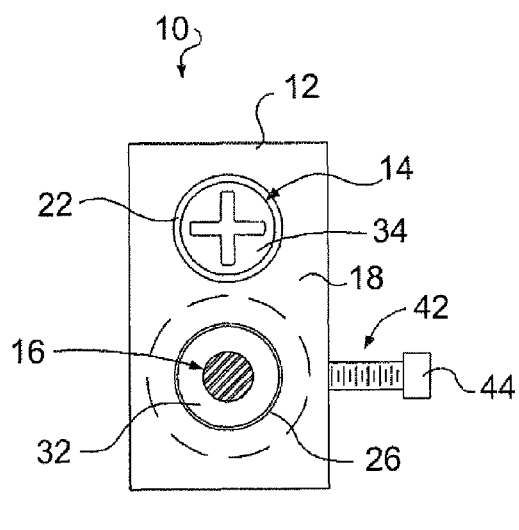
FIGS. 4(a) and 4(b) are front elevations of the fastening assembly of FIG. 1, showing that the fastening assembly is rotatable.
Figure 4B:
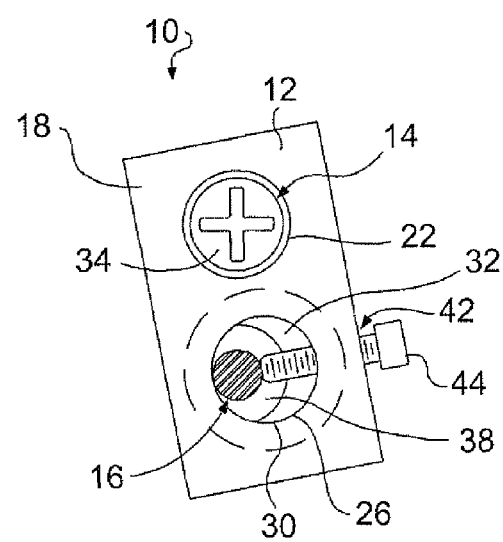

The first fastener 14 may comprise a wood screw as shown in FIG. 1 or a machine screw as shown in FIG. 3 or another type of fastener without departing from the scope of the present invention. Further, fastener 14 may be integral with plate 12 or may be permanently secured thereto. However, it is preferred that the fastener 14 is rotatable relative to the plate 12. As shown in FIGS. 1 and 3, the first fastener 14 includes a head 34 configured to engage the plate 12 and a portion 36 for engaging the mounting surface S. The head 34 is preferably sized to fit the countersunk hole 22, and is preferably flat so that the head of the fastener 14 is flush with the plate 12 once installed. The threaded portion 36 of the first fastener 14 is sized such that the threads provide a substantial gripping strength, but the length of the threaded portion does not exceed the thickness of the mounting surface S. As is shown in FIGS. 4(a) and 4(b), the first fastener 14 preferably is rotatably held within plate hole 22 such that the plate is secured to the mounting surface, but remains rotatable about the first fastener.

The second fastener 16 may be a wood screw, machine screw or other type of screw depending on the application. Other fastener types, such as a nail, are also contemplated. The second fastener 16 includes a head 38 sized to be smaller than the front face opening 32 of the plate 12 so that the head 38 can pass through the opening 32. Once past the front face opening 32 of the hole 26, the head 38 can engage the countersunk hole in the back side of the plate. The second fastener 16 also includes a portion 40 for engagement of the object O to be hung. The head 38 of the second fastener 16 is preferably a flat head so that the head may be retained within the second hole 26, even when the rear face 20 of the plate 12 is flush with the mounting surface S. The object engaging portion 40 of the second fastener 16 is preferably selected so that the engagement portion does not pass entirely through the object O to be hung.

The fastening assembly 10 further includes a locking mechanism 42. A preferred locking mechanism 42 is a set screw 44 extending through a bore 46. Alternatively other locking mechanisms such as a pin could be used. The bore 46 preferably extends transversely from an edge of the plate 12 to the second hole 26, so that the set screw 44 can engage the head 38 of the second fastener 16. While the set screw 44 and bore 46 shown extending perpendicular to a major axis of the plate 12, it will be appreciated that this is merely an example of the locking mechanism 42, and that the set screw 44 and bore 46, may extend at any position and at any angle that is convenient for manufacturing and use without departing from the scope of the present invention. Although a single bore and screw are shown in the drawings, it is contemplated and preferred that plate comprise multiple bores 46. Preferably at least one bore is provided on each side and the bottom edge of plate 12 so that the plate is universal for left, right and bottom applications. The user can select one or more bores to insert set screws. The locking mechanism 42 advantageously secures the object O to the fastener 16, so that accidental contact with the object does not dislodge the object. Moreover, the locking mechanism 42 prevents those who are not familiar with its operation from removing the object O from its mounting structure S.

In use, a user selects a location on the mounting surface S to attach the plate 12. The plate 12 is then preferably attached to the mounting surface S using the first fastener 14. Independently, the second fastener 16 is attached to the object O to be hung. Once the plate 12 is attached to the mounting surface S and the second fastener 16 is attached to the object O to be hung, the head 38 of the second fastener 16 is inserted into the second hole 26. After the second fastener head 38 passes through the opening 32 in the front face of the plate 12, the object O is lowered so that the fastener head engages the lip 30. The fastener head 38 and lip 30 are preferably beveled to mate with each other. The weight of the object O will hold the fastener head 38 to the lip 30. The locking mechanism 42 further secures the connection. Specifically, the set screw 44 preferably engages the fastener, preferably the head portion 38, to clamp the fastener between the set screw 44 and the lip 30.

Then, the set screw 44 is inserted into bore 46, causing the plate 12 to rotate against the head 38 of the second fastener 16 which is then securely clamped between the set screw 44 and the lip 30 formed by the countersink 28 of the second hole 26. It is noted that while the process is explained for hanging an object using a single fastening assembly, those of skill in the art will recognize that multiple assemblies may be used without departing from the scope of the invention.

The plate assembly is free to rotate as the second fastener head 38 is securely captured between the set screw 44 and the lip 30 formed by the countersink 28 of the second hole 26, in multiple fastening assembly installation of a given object O, the intended position of object O is maintained because the plate rotates or swivels, allowing the object O to remain in the intended position as the locking mechanism 42 is set. The benefits of this rotational action of plate 12 in applications calling for multi-fastener assemblies per single object O become obvious when securing objects such as panels or enclosure shells that have a specific fit and can't shift as they are locked into place. Furthermore, as a benefit, the converse is possible, namely, attached object O can be purposely shifted while locking down as a means to correct for slight out-of-position drilled holes.

Figures 5, 6:
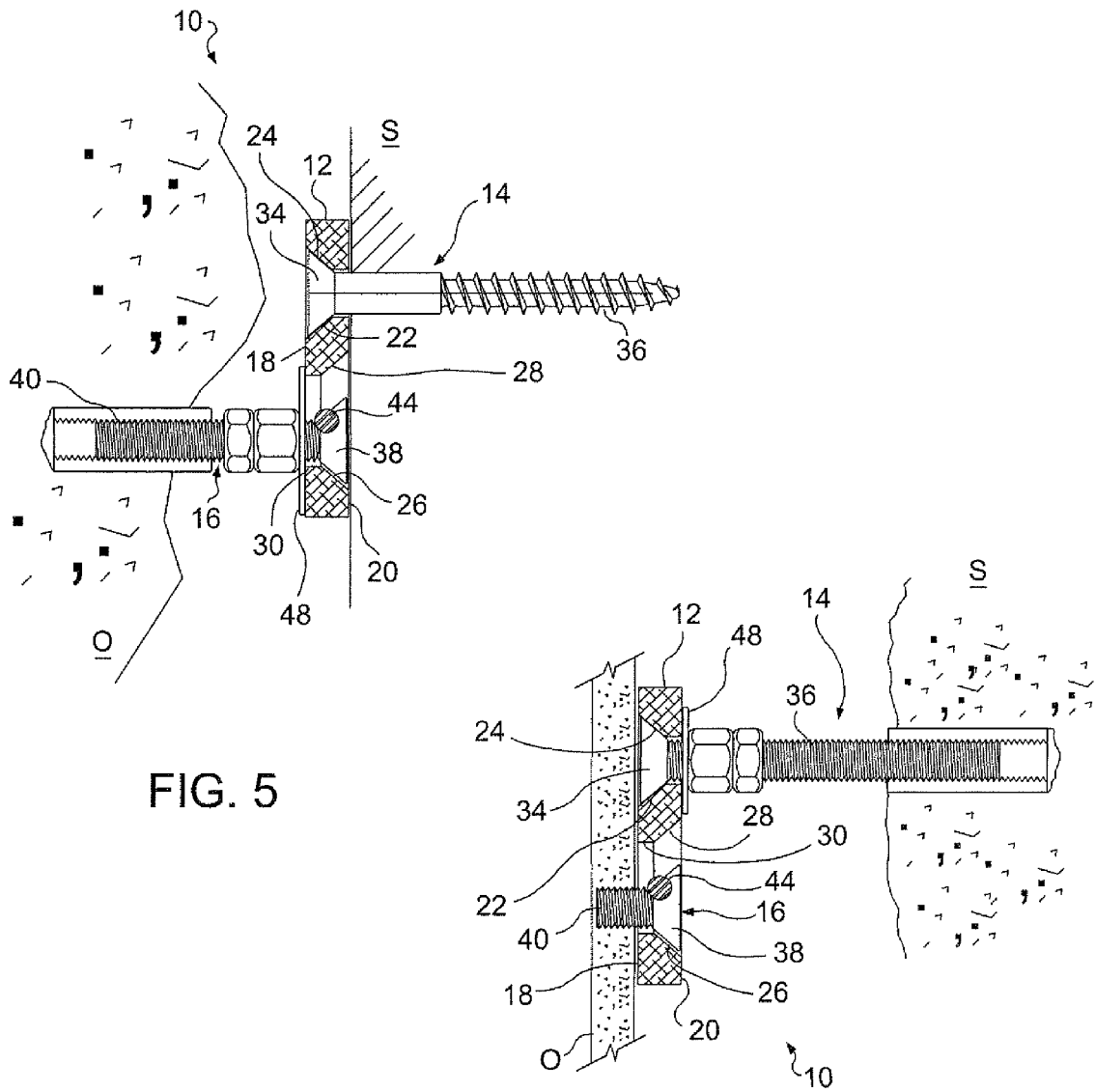
FIG. 5 is a vertical cross-sectional view of a third embodiment of the fastening assembly.
FIG. 6 is a vertical cross-sectional view of a fourth embodiment of the fastening assembly.

Additionally, as shown in FIG. 5, the fastening assembly 10 may be used to fasten an irregularly shaped object O to a mounting surface S. In such cases, a flat washer or stop 48 is positioned on the second fastener 16, between the object to be hung and the plate 12, such that the washer is flush against the plate. Similarly, as shown in FIG. 6, an object O may be hung on an irregular mounting surface S by positioning the flat washer or stop 48 on the first fastener 14, between the mounting surface and the plate 12, such that the plate is flush with the flat washer.

The fastener assembly of the invention thus presents a tamper-resistant attachment means that incorporates standard hardware that can be installed with common tools and proper know-how. The fastening assembly accommodates attachments of planar as well as various shaped objects to various mounting surfaces from smooth planar to irregular, highly reliefed. Because of the swing action of the design in capturing the head of utilized common hardware, there is no shift of the object from the intended mounting spot as the object is secured. Conversely, minute adjustments in positioning the attached object is possible by the swing-action design. The application of the fastener of the invention is broad; anywhere there is a need to secure a hung object beyond just the action of gravitational forces. Therefore, signage, artwork/sculpture installations, indoors, outdoors, wall attachments in mobile environments such as land and marine transportation vehicles, and any attachment orientation other than vertical, etc. With further variation in plate shapes dictated by the application, the subject fastening device and assembly can offer easily remove and replace attachment means in such automotive applications as dash panel mounting or enclosure assembly during manufacturing of cabinet panels, as well as providing tamper-resistant panel attachment for maintenance/servicing requirements.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

The invention claimed is:

1. A fastening device for fastening an object to a structure or surface using a first fastener and a second fastener having a head, the fastening device comprising
a plate having a first opening, a second opening spaced from the first opening and a lip adjacent said second opening, said first opening configured to receive the first fastener for attaching said plate to the structure, said second opening configured to receive the head of the second fastener for connection to the object, and said lip configured to hold the head of the second fastener, said place being pivotable with respect to both the first and second fasteners, and
a locking member on said plate, said locking member configured to selectively engage said second fastener and upon engagement causing the plate to rotate while maintaining the relative position of the object to the structure or surface, and to secure said second fastener to the lip on said plate.

2. The fastening device of claim 1, wherein said first and second openings are oppositely directed tapered holes.

3. The fastening device of claim 1, wherein said second opening is a tapered hole through said plate and said lip is defined by the margin of said plate at the narrow end of the tapered hole.

4. The fastening device of claim 1, wherein said locking member includes at least one bore in said plate extending from an edge of said plate into said second opening, and at least one set screw in said at least one bore.

5. A fastening assembly for fastening an object to a surface, the assembly comprising:
a plate having a first hole and a second hole, said plate having a lip adjacent said second hole;
a first fastener configured to extend through said first hole for attaching said plate to the surface, said first fastener having a head larger than at least a portion of said first hole;
a second fastener having a head with a diameter, the greatest diameter of the second fastener head being smaller than the smallest diameter of said second hole such that the second fastener head can extend into said second hole and engage the lip of the plate for removably holding said second fastener to said plate, said second fastener adapted for connection to the object;
said plate being pivotable with respect to both the first and second fasteners; and
a locking member on said plate, said locking member configured to selectively engage said second fastener to clamp said second fastener between said locking member and said plate.

6. The fastening assembly of claim 5, wherein said first fastener is adapted for rotatable attachment to said plate such that said plate is free to rotate about said first fastener.

7. The fastening assembly of claim 5, wherein said locking member includes a set screw held in a bore in said plate.

8. The fastening assembly as in claim 5, wherein said locking member comprises at least one bore in said plate extending from one edge of said plate into said second hole, and at least one set screw configured to be received in a said at least one bore.

9. The fastening assembly of claim 5, wherein said first hole and said second hole are at least partially tapered in opposing directions.

10. A fastening assembly for fastening an object to a structure, the assembly comprising:
a plate having a face, a first hole through the plate and a cavity having an opening on the face of the plate, said opening having a transverse dimension smaller than that of said cavity;
a first fastener configured to extend through said first hole and having a head for engaging said plate, said plate being pivotal about said first fastener, said first fastener adapted for attaching said plate to the structure;
a second fastener having a head with a transverse dimension smaller than said cavity opening in said face and configured so that the second fastener head can pass through said opening and engage said plate from within said cavity to hold said second fastener to said plate, said plate being pivotal about said second fastener, said second fastener adapted for connection to the object, and
a locking member on said plate, said locking member configured to selectively engage the head of said second fastener in said cavity to secure said second fastener to said plate.

11. The fastening assembly of claim 10, wherein said first hole is countersunk from said face of said plate, and said cavity comprises a through hole in said plate countersunk from another face of said plate.

12. The fastening assembly of claim 10, wherein said locking member includes a set screw held in a bore in said plate.

* * * * *